United States Patent [19]

Cuscurida et al.

[11] Patent Number: 4,992,590

[45] Date of Patent: Feb. 12, 1991

[54] POLYAMINES BY AMINATION OF POLYAMINO INITIATED POLYOXYALKYLENE GLYCOLS

[75] Inventors: Michael Cuscurida; John M. Larkin, both of Austin; Kathy B. Sellstrom, Pflugerville; Robert A. Grigsby, Jr., Georgetown, all of Tex.

[73] Assignee: Texaco Chemical Company, White Plains, Tex.

[21] Appl. No.: 415,802

[22] Filed: Oct. 2, 1989

[51] Int. Cl.$^5$ .................. C07C 213/00; C07C 215/00; C07C 217/00
[52] U.S. Cl. ..................................... 564/505; 564/475
[58] Field of Search ......................................... 564/505

[56] References Cited

U.S. PATENT DOCUMENTS

| 2,923,696 | 2/1960 | Harwell et al. | 260/47 |
| 3,189,653 | 6/1965 | Rudner et al. | 564/505 |
| 3,347,926 | 10/1967 | Zech | 260/585 |
| 3,373,204 | 3/1968 | Hales et al. | 260/570.7 |
| 3,390,184 | 6/1968 | Moss et al. | 260/585 |
| 3,654,370 | 4/1972 | Yeakey | 260/584 B |
| 4,130,590 | 12/1978 | Hobbs et al. | 260/585 D |
| 4,168,242 | 9/1979 | Soula | 564/505 |
| 4,409,399 | 10/1983 | Swift et al. | 564/473 |
| 4,581,470 | 4/1986 | Hoy et al. | 564/505 |

FOREIGN PATENT DOCUMENTS 108193 4/1964 Netherlands ...................... 564/505

Primary Examiner—Richard L. Raymond
Assistant Examiner—Scott C. Rand
Attorney, Agent, or Firm—Jack H. Park; Kenneth R. Priem; David L. Mossman

[57] ABSTRACT

A process in which a polyamine initiator is oxyalkylated to form the corresponding polyamine polyoxyalkylene glycol which is then catalytically aminated to provide a polyoxyalkylenepolyamine is disclosed. These compounds are useful as curing agents for epoxy resins and for reaction with isocyanates to manufacture articles, such as automotive body panels, by reaction injection molding.

8 Claims, No Drawings

POLYAMINES BY AMINATION OF POLYAMINO INITIATED POLYOXYALKYLENE GLYCOLS

BACKGROUND OF THE INVENTION

1. Field of the Invention

This invention relates to polyoxyalkylenepolyamines and to a method for their preparation by amination of alkylene oxide adducts of polyamine initiators. In another aspect, this invention relates to the use of the polyoxyalkylenepolyamines in RIM elastomers and epoxy castings and adhesives.

2. Prior Art

The amination of long alkoxylated alkyl chains terminated by hydroxyl groups is well-known in the art.

U.S. Pat. No. 3,654,370 to E. L. Yeakey teaches the amination of polyoxyalkylene polyols to form the corresponding amines by means of ammonia and hydrogen over a catalyst prepared by the reduction of a mixture of the oxides of nickel, copper and chromium. The amination is carried out at a temperature of 150° to 275° C. and 500 to 5000 psig.

U.S. Pat. No. 4,409,399 to H. E. Swift, et al., teaches a catalyst for aminating aliphatic alcohols and aldehydes. The unsupported catalyst comprises (1) copper oxide or copper hydroxide and (2) nickel oxide or nickel hydroxide, and optionally (3) an oxide or hydroxide of a: Group IIA; e.g., magnesium, barium. The reaction is carried out at a temperature of 150° to 250° C. and 1 to 100 atm with continuous water removal.

U.S. Pat. No. 3,390,184 to P. H. Moss, et al., teaches a process for converting a secondary alcohol to a high-molecular weight primary amine by means of a hydrogenation-dehydrogenation catalyst comprising at least one member selected from the group consisting of the metals and oxides of nickel and cobalt, together with copper and a metal oxide selected from the group consisting of chromium oxide, molybdenum oxide, manganese oxide and thorium oxide. The reaction is carried out at a temperature of 225° to 260° C. and pressure of 2000 to 4000 psig, with ammonia as the aminating agent.

U.S. Pat. No. 3,373,204 to R. A. Hales, et al., teaches a catalytic process for producing secondary amines from derivatives of phenols, alcohols and amines containing 5 to 40 moles of ethylene oxide and propylene oxide. The catalyst is Raney nickel and ammonia or primary alkylamines as the aminating agent. The reaction is carried out at 200° to 275° C. with the evolution of water. Amines include lauryl amine, hexadecyl amine, octadecyl amine, rosin amine and fatty acid amines.

U.S. Pat. No. 3,347,926 to J. D. Zech teaches a catalytic process for aminating primary and secondary aliphatic alcohols. The catalyst comprises a chromium-promoted Raney nickel. The reaction is carried out at 150° to 275° C. with ammonia, primary amines or secondary amines of 1 to 6 carbon atoms.

U.S. Pat. No. 2,923,696 to K. E. Harwell, et al., teaches resinous compositions formed by the reaction of an epoxy resin with a high-boiling amine product. The patent further teaches hydrogenation catalysts employing copper, nickel, cobalt and oxides thereof.

U.S. Pat. No. 4,130,590 to Hobbs, et al., teaches the production of long-chain unsaturated amines such as N-(alkadienyl)amines and saturated or hydrated derivatives thereof.

SUMMARY OF THE INVENTION

This invention relates to polyoxyalkylenepolyamines of the formula:

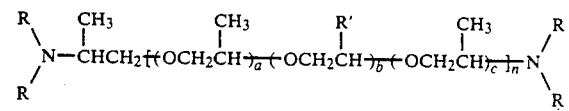

wherein $a+b+c=2-100$ and R is:

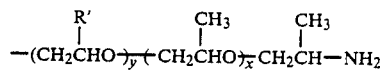

R' is selected from the group consisting of hydrogen and the methyl or ethyl radical, x ranges from 0 to about 10, y ranges from 2 to about 100, n is 0 or 1, and with the proviso that when n is 0, then R' is the methyl or ethyl radical.

Preferably, the sum of $x+y$ ranges from about 2 to 50 and R' is the methyl radical.

This invention also relates to polyoxyalkylenepolyamines of the formula:

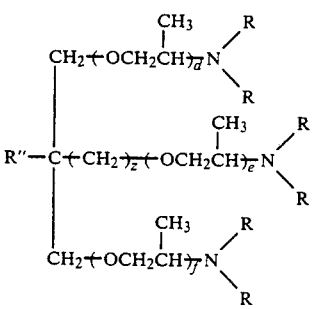

wherein R is:

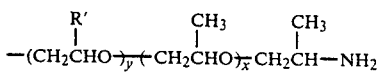

R' is selected from the group consisting of hydrogen and the methyl or ethyl radical, x ranges from 0 to about 10, y ranges from 2 to about 100, z is 0 or 1, the sum of $e+e+f$ ranges from 3 to about 100, and R'' is selected from the group consisting of hydrogen and the methyl or ethyl radical.

Preferably, the sum of $d+e+f$ ranges from 10 to about 90, the sum of $x+y$ ranges from 2 to about 50, and R'' is the methyl radical.

In another aspect, this invention relates to a process for producing a polyoxyalkylenepolyamine which comprises:

(A) alkoxylating a polyamine selected from the group consisting of (1) an alkylenediamine, (2) a polyoxyalkylenediamine, and (3) a polyoxyalkylenetriamine to form the corresponding polyamine polyoxyalkylene polyol having at least two terminal groups of the structure:

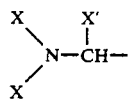

wherein X is a hydroxyl-terminated polyoxyalkylene group and X' is the methyl radical and with the proviso that in one of the terminal groups formed when an alkylene diamine is alkoxylated, X' is hydrogen and when X' is hydrogen, the oxyalkylene segment of the polyoxyalkylene groups attached to the nitrogen atom bears a pendant methyl or ethyl radical, and (B) catalytically aminating the said polyol with ammonia in the presence of hydrogen to form the polyoxyalkylenepolyamine.

The polyamines of this invention are particularly suited for reaction with isocyanates to manufacture articles by a Reaction Injection Molding (RIM) process.

Reaction Injection Molding (RIM) is a technique for the rapid mixing and molding of large, fast-curing urethane parts. RIM polyurethane parts are used in a variety of exterior body applications on automobiles where the light weight contributes to energy conservation. RIM parts are generally made by rapidly mixing active hydrogen-containing materials with polyisocyanate and placing the mixture into a mold where reaction proceeds. After reaction and demolding, the parts may be subjected to an additional curing step which comprises placing the parts in an oven, held at 250° F. or higher.

Surprisingly, it also has been found that the polyoxyalkylenepolyamines of this invention are useful as curing agents in forming clear epoxy castings and adhesives with highly satisfactory physical properties. Such epoxy products find application in the electrical and electronic fields.

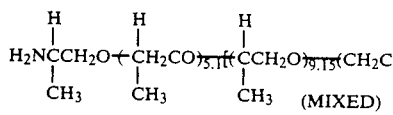

DESCRIPTION OF THE PREFERRED EMBODIMENTS

The polyamine polyoxyalkylene glycols are aminated as set out in U.S. Pat. No. 3,654,370 to E. L. Yeakey, which describes the amination of polyoxyalkylene polyols to, form the corresponding amines. The amination is conducted in the presence of a catalyst prepared from a mixture of the oxides of nickel, copper and chromium and in the presence of ammonia and hydrogen at 150° to 275° C. and about 500 to about 5000 psig. It has been discovered that the polyamine polyoxyalkylene glycols formed by alkoxylating the polyamine initiators can be reductively aminated provided that the internal tertiary nitrogens are sterically hindered. Hindrance of the tertiary nitrogens stabilizes the molecule and thus prevents cleavage at the tertiary nitrogens by the metallic catalyst.

In the instant invention, each of the internal tertiary nitrogen atoms is hindered by a pendant alkyl group attached to the carbon atom adjacent to the tertiary nitrogen and/or by pendant alkyl groups of the oxalkylene groups directly attached to the tertiary nitrogen. If the tertiary nitrogens are not hindered, the polyether chains are cleaved at the nitrogen atoms, yielding a variety of decomposition products rather than the desired polyoxyakylenepolyamine. It is shown in a comparative example that if attack on the tertiary nitrogen atom is not hindered, the identical process conditions yield a wide variety of degradation products. For example, when a compound such as:

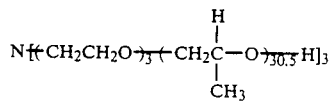

is aminated, migration of the methyl group and cleavage of the chain at the nitrogen atom predominates.

Preferred starting materials, i.e., the polyamine initiators, include, for example, 1,2-propane diamine, polyoxyalkylenediamines such as the JEFFAMINE® D series as exempled by:

JEFFAMINE® D-230 having the formula:

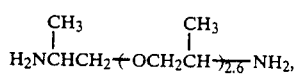

JEFFAMINE® D-400 having the formula:

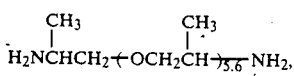

JEFFAMINE® D-2000 having the formula:

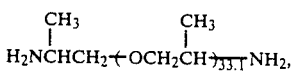

polyoxyalkylenediamines such, as the JEFFAMINE® ED series, as exemplified by:

JEFFAMINE® ED-6000 having the formula:

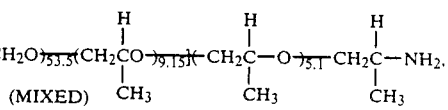

and polyoxyalkylenetriamines, such as the JEFFAMINE® T series, as exemplified by:

JEFFAMINE® T-403 having the formula:

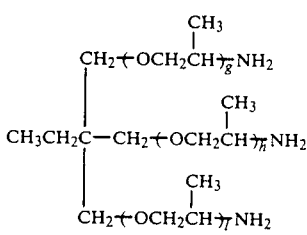

wherein the sum of g+h+i is about 5.3 and JEFFAMINE® T-5000 having the formula:

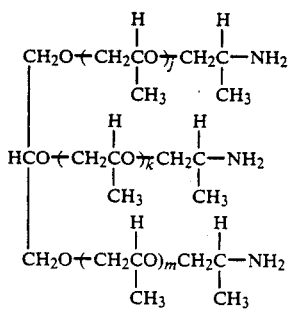

wherein the sum of j+k+m is about 85. All of the above JEFFAMINE® polyoxyalkyleneamine products are marketed by the Texaco Chemical Company, Houston, Tex.

The alkoxylation is carried out according to methods well known in the art and described in the Examples. Useful alkylene oxides include ethylene oxide, propylene oxide, and butylene oxide, while the preferred oxide is propylene oxide.

The following examples, which illustrate the nature of the instant invention, are not intended to be limitative.

EXAMPLE 1

Preparation Of The 6200 Molecular Weight Propylene Oxide Adduct Of 1,2-Propanediamine (PDA)

Six pounds 1,2-PDA was charged into a five-gallon kettle. The reactor was then purged with prepurified nitrogen. Propylene oxide (19.75 lb) was then reacted at 100° C. at 50 psig. Approximately one hour was required for addition of the propylene oxide. The reaction mixture was then digested at 120°-125° C., for one hour, vacuum stripped to a minimum pressure, nitrogen stripped, and drained from the kettle. Properties of the tetrol intermediate, i.e., 1,2-propanediamine alkoxylated with 4 moles of propylene oxide (PDA-4PO), were as follows:

| | |
|---|---|
| Total amine, meq/g | 3.27 |
| Tertiary amine, meq/g | 3.27 |
| Hydroxyl no., mg KOH/g | 713 |
| Water, wt % | 0.03 |
| pH in 10:6 isopropanol-water | 11.6 |
| Viscosity, 77° F., cps | ≈1.5 × 10$^6$ |

Into a ten-gallon kettle were charged 10 lb of the PDA-4PO and 151.2 g 45% aqueous potassium hydroxide. The reactor was then purged with prepurified nitrogen. The initiator was then dried to a water content of less than 0.1% using both vacuum and nitrogen stripping. Propylene oxide (10 lb) was reacted at 105°-110° C. at 50 psig over a three-hour period. After digestion to an equilibrium pressure, the initiator was neutralized at 95° C. by stirring two hours with 600 g of magnesium silicate which was added as an aqueous slurry. The neutralized product was then vacuum stripped to a minimum pressure, nitrogen stripped, and filtered. This product had the following properties:

| | |
|---|---|
| Total amine, meq/g | 2.50 |
| Tertiary amine, meq/g | 2.46 |
| Hydroxyl no., mg KOH/g | 274 |
| Water, wt % | 0.06 |
| pH in 10:6 isopropanol-water | 11.4 |
| Color, Pt—Co | 30 |
| Sodium, ppm | 0.2 |
| Potassium, ppm | 0.6 |
| Viscosity, °F., cs | |
| 77 | 2026 |
| 100 | 633 |

Into a ten-gallon kettle were charged 5 lbs of the 274 hydroxyl no. PDA polyol and 151.2 g 45% potassium hydroxide. The reactor was then purged with prepurified nitrogen. The initiator was dried by vacuum and nitrogen stripping to a water content of less than 0.1%. Propylene oxide (44.3 lb) was reacted at 105°-110° C. at 50 psig over a 6-7 hour period. The reaction mixture was then digested to a minimum pressure. The product was subsequently neutralized at 95° C. by stirring two hours with 408 g of magnesium silicate which was added as an aqueous slurry. Di-t-butyl p-cresol (22.4 g) was then added to stabilize the product. The neutralized product was vacuum stripped to a minimum pressure, nitrogen stripped and filtered. The finished product, a 6200 molecular weight polyol, had the following properties:

| | Run 1 | Run 2 |
|---|---|---|
| Total amine, meq/g | 0.26 | 0.26 |
| Hydroxyl no., mg KOH/g | 36.4 | 36.4 |
| Water, wt % | 0.017 | 0.01 |
| pH in 10:6 isopropanol-water | 9.5 | 9.6 |
| Color, Pt—Co | 25 | 25 |
| Sodium, ppm | 0.4 | 0.2 |
| Potassium, ppm | 1.6 | 0.3 |
| Viscosity, °F., cs | | |
| 77 | 1114 | 1157 |
| 100 | 562 | 575 |

EXAMPLE 2

Preparation Of The 5800 Molecular Weight Propylene Oxide Adduct of JEFFAMINE® D-230

Eight-pounds of JEFFAMINE® D-230 was charged into a five-gallon kettle which was purged with prepurified nitrogen. Propylene oxide (8.2 lb) was then reacted at 145°-150° C. at 50 psig over a 5.5-hour period. After vacuum and nitrogen stripping, the product was cooled to 100° C. and drained from the kettle. This product (i.e., JEFFAMINE® D-230 alkoxylated with 4 moles of propylene oxide) had the following properties:

| | |
|---|---|
| Total amine, meq/g | 4.29 |
| Tertiary amine, meq/g | 4.19 |
| Hydroxyl no., mg KOH/g | 441 |
| Water, wt % | 0.008 |
| pH in 10:6 isopropanol-water | 11.4 |
| Color, Pt—Co | 25 |
| Sodium, ppm | 0.2 |
| Potassium, ppm | 0.6 |
| Viscosity, °F., cs | |
| 77 | 2026 |
| 100 | 633 |

Into a ten-gallon kettle were charged 10 lb of the JEFFAMINE® D-230-4PO adduct and 151.2 g 45% aqueous potassium hydroxide. The reactor was then purged with prepurified nitrogen. The initiator was dried to a water content of less than 0.1% using both vacuum and nitrogen stripping. Propylene oxide (16.1 lb) was then reacted at 120°–125° C. at 50 psig over a four-hour period. After digestion to an equilibrium pressure, the product was neutralized at 95° C. by stirring two hours with 600 g of magnesium silicate which was added as an aqueous slurry. The neutralized product was then vacuum stripped to a minimum pressure, nitrogen stripped, and filtered. The finished product had the following properties:

| | |
|---|---|
| Total amine, meq/g | 1.62 |
| Tertiary amine, meq/g | 1.60 |
| Hydroxyl no., mg KOH/g | 160 |
| Water, wt % | 0.02 |
| pH in 10:6 isopropanol-water | 10.9 |
| Color, Pt—Co | 25 |
| Sodium, ppm | 0.2 |
| Potassium, ppm | 1.3 |
| Viscosity, °F., cs | |
| 77 | 994 |
| 100 | 369 |

Into a ten-gallon kettle were charged 10 lb of the 160 hydroxyl No. JEFFAMINE ® D-230 polyol prepared as described above and 304 g 45% aqueous potassium hydroxide. The reactor was then purged with prepurified nitrogen. The initiator was then heated to 100° C. and dried to a water content of less than 0.1% using both vacuum and nitrogen stripping. Propylene oxide (48 lb) was then added at 105°–110° C. at 50 psig over a 4.75-hour period. After digestion to an equilibrium pressure, the product was neutralized at 99° C. by stirring two hours with 821 g of magnesium silicate which was added as an aqueous slurry. Di-t-butyl p-cresol (26.3 g) was then added to stabilize the product. The neutralized product was then vacuum stripped to a minimum pressure, nitrogen stripped, and filtered. The finished product, i.e., the 5800 polyol, had the following properties:

| | |
|---|---|
| Total amine, meq/g | 0.28 |
| Tertiary amine, meq/g | 0.28 |
| Hydroxyl no., mg KOH/g | 38.6 |
| Water, wt % | 0.01 |
| pH in 10:6 isopropanol-water | 9.8 |
| Color, Pt—Co | 10 |
| Sodium, ppm | 0.2 |
| Potassium, ppm | 0.2 |
| Viscosity, °F., cs | |
| 77 | 1049 |
| 100 | 519 |

EXAMPLE 3

Preparation Of The 5100 Molecular Weight Propylene Oxide Adduct Of JEFFAMINE ® D-400

Twelve pounds of JEFFAMINE ® D-400 was charged into a five-gallon kettle which was then flushed with prepurified nitrogen. Propylene oxide (8.7 lb) was then reacted at 145°–150° C. over a 5.2-hour period. The reaction mixture was then digested two hours to an equilibrium pressure. After vacuum and nitrogen stripping, the product was cooled to 100° C. and drained from the kettle. The finished product (i.e., JEFFAMINE ® D-400 alkoxylated with 4 moles of propylene oxide) had the following properties:

| | |
|---|---|
| Total amine, meq/g | 2.99 |

| -continued | |
|---|---|
| Tertiary amine, meq/g | 2.99 |
| Hydroxyl no., mg KOH/g | 334 |
| pH in 10:6 isopropanol-water | 10.6 |
| Color, Pt—Co | 40 |
| Viscosity, °F., cs | |
| 77 | 2458 |
| 100 | 664 |

Ten pounds of the JEFFAMINE ® D-400 4PO product prepared as described above and 304 g of 45% aqueous potassium hydroxide were charged into a ten-gallon kettle. The reactor was then purged with prepurified nitrogen. The initiator was then heated to 100° C. and dried to a water content of less than 0.1% employing both vacuum and nitrogen stripping. Propylene oxide (70 lb) was then reacted at 105°–110° C. at 50 psig. Approximately nine hours was required for addition of the PO. After a two-hour digestion to an equilibrium pressure, the alkaline product was neutralized at 95° C. by stirring two hours with 821 g of magnesium silicate which was added as an aqueous slurry. Di-t-butyl-p-cresol (26 g) was then added to stabilize the polyol. The neutralized product was subsequently vacuum stripped to a minimum pressure, nitrogen stripped, and filtered. The finished product, i.e., the 5100 molecular weight polyol, had the following properties:

| | |
|---|---|
| Total amine, meq/g | 0.39 |
| Tertiary amine, meq/g | 0.36 |
| Hydroxyl no., mg KOH/g | 44.2 |
| Water, wt % | 0.02 |
| pH in 10:6 isopropanol-water | 9.6 |
| Color, Pt—Co | 20 |
| Sodium, ppm | 0.2 |
| Potassium, ppm | 0.2 |
| Viscosity, °F., cs | |
| 77 | 971 |
| 100 | 463 |

EXAMPLE 4

Continuous Reduction Amination Of The 6200 Molecular Weight Propylene Oxide Adduct Of 1,2-Propane Diamine (PDA)

A 1200-cc. tubular reactor was charged with 6×8 mesh Raney nickel. It was maintained at 2000 psig while ammonia, hydrogen and the polyol of Example 1 (i.e., the 6200 molecular weight propylene oxide adduct of 1,2-propane diamine) were simultaneously introduced at six sets of operating conditions. The conditions and results are shown in Table I.

EXAMPLE 5

Continuous Reduction Amination Of The 5800 Molecular Weight Propylene Oxide Adduct Of JEFFAMINE ® D-230

The procedure of Example 4 was repeated except that the polyol of Example 2 (i.e., the 5800 molecular weight adduct of JEFFAMINE ® D-230) was fed to the reactor at four sets of conditions, and the catalyst was the Ni/Cu/Cr catalyst of U.S. Pat. No. 3,654,370 to Yeakey. The conditions and results are shown in Table II.

EXAMPLE 6

Continuous Reduction Amination Of The 5100 Molecular Weight Propylene Oxide Adduct Of JEFFAMINE® D-400

The procedure of Example 5 was essentially duplicated except that the polyol introduced into the reactor was the 5100 molecular weight propylene oxide adduct of JEFFAMINE® D-400 of Example 3, the catalyst was introduced into the reactor at four sets of conditions, and the catalyst was 825 cc of an extruded Ni/Cu/Cr/Mo formulation. Conditions and results are shown in Table III.

Examples 4, 5 and 6 show that high conversions of the hydroxyl groups to the primary amines were obtained and that the tertiary amine functionality present in the starting materials was nearly completely preserved.

The autoclave was flushed with hydrogen, and 16.2 g ammonia was charged. Hydrogen was introduced until the pressure reached 352 psig. The autoclave was then heated over a 40-minute period to 240.7° C. and 839 psig. The autoclave was held at 223.3°-239° C. for 20 minutes thereafter, and cooled to room temperatures. After filtration and removal of ammonia and water by stripping the filtrate on a rotary evaporator at 99° C./20 mm Hg, the product had the following analyses:

| | |
|---|---|
| Total acetylatables, meq/g | 0.738 |
| Total amines, meq/g | 0.62 |
| Primary amine, meq/g | 0.47 |
| Tertiary amine, meq/g | 0.04 |

This example demonstrates that with a polypropoxylated non-hindered amine, the tertiary amine functionality is severely degraded, with only 27% of the tertiary amine functionality being retained.

TABLE I

CONTINUOUS PREPARATION OF PRODUCT OF EXAMPLE 4 USING RANEY NICKEL CATALYST

| Stripped Material Ref. No. | Hot Spot Temp. °C. | Reactor Pressure psig | Polyol Wt SV g/cc/Hr | Weight % Ammonia | Hydrogen Flow rate l/Hr | Total Acetyl Meq/g | Total Amines Meq/g | Primary Amines Meq/g | Tertiary Amines Meq/g | % Conv. |
|---|---|---|---|---|---|---|---|---|---|---|
| 6222-92-1 | 215 | 2000 | .35 | 54.13 | 35.00 | .65 | .77 | .52 | .24 | 81.41 |
| 6222-92-2 | 220 | 2000 | .35 | 54.54 | 35.00 | .66 | .81 | .56 | .24 | 85.84 |
| 6222-92-3 | 225 | 2000 | .33 | 54.89 | 35.00 | .65 | .83 | .58 | .23 | 92.02 |
| 6222-95-1 | 219 | 2000 | .30 | 54.90 | 35.00 | .63 | .81 | .56 | .24 | 89.90 |
| 6222-95-2 | 221 | 2000 | .31 | 53.47 | 35.00 | .66 | .80 | .56 | .24 | 84.98 |
| 6222-98-1 | 223 | 2000 | .21 | 57.46 | 30.00 | .64 | .84 | .59 | .23 | 95.02 |

TABLE II

CONTINUOUS PREPARATION OF PRODUCT OF EXAMPLE 5 USING Ni/Cu/Cr CATALYST

| Stripped Material Ref. No. | Hot Spot Temp. °C. | Reactor Pressure psig | Polyol Wt SV g/cc/Hr | Weight % Ammonia | Hydrogen Flow rate l/Hr | Total Acetyl Meq/g | Total Amines Meq/g | Primary Amines Meq/g | Tertiary Amines Meq/g | % Conv. |
|---|---|---|---|---|---|---|---|---|---|---|
| 6292-12-1 | 210 | 2000 | .36 | 55.87 | 40.00 | .78 | .99 | .75 | .24 | 96.15 |
| 6292-12-2 | 220 | 2000 | .37 | 54.77 | 40.00 | .82 | 1.03 | .78 | .21 | 100.12 |
| 6292-15-1 | 215 | 2000 | .57 | 49.40 | 45.00 | .73 | .98 | .72 | .25 | 99.46 |
| 6292-18-1 | 200 | 2000 | .47 | 54.87 | 40.00 | .70 | .94 | .66 | .27 | 95.71 |

TABLE III

CONTINUOUS PREPARATION OF PRODUCT OF EXAMPLE 6 USING Ni/Cu/Cr/Mo CATALYST

| Stripped Material Ref. No. | Hot Spot Temp. °C. | Reactor Pressure psig | Polyol Wt SV g/cc/Hr | Weight % Ammonia | Hydrogen Flow rate l/Hr | Total Acetyl Meq/g | Total Amines Meq/g | Primary Amines Meq/g | Tertiary Amines Meq/g | % Conv. |
|---|---|---|---|---|---|---|---|---|---|---|
| 6292-73-1 | 195 | 1800 | 1.12 | 55.24 | 65.00 | .78 | .96 | .58 | .36 | 76.53 |
| 6292-73-2 | 205 | 1800 | 1.11 | 55.20 | 65.00 | .81 | 1.15 | .78 | .35 | 98.64 |
| 6292-73-3 | 210 | 1800 | 1.12 | 54.88 | 65.00 | .83 | 1.16 | .78 | .35 | 97.33 |
| 6292-77-1 | 205 | 1800 | 1.11 | 28.28 | 65.00 | .80 | 1.15 | .77 | .35 | 99.75 |

EXAMPLE 7

Comparative

A one-liter stirred autoclave was charged with 15.08 g of anhydrous molybdenum-promoted Raney nickel (RANEY 3100) catalyst, and with 139.03 g of the polypropoxylated triethanolamine having the following analyses:

| | |
|---|---|
| Total acetylatables, meq/g | 0.549 |
| Total amines, meq/g | 0.16 |
| Tertiary amines, meq/g | 0.15 |

PREPARATION OF RIM ELASTOMERS

The polyoxyalkylenepolyamines of this invention are useful for producing RIM elastomers. Surprisingly, such RIM elastomers can be molded at lower temperatures than those made with prior art materials without exhibiting brittleness. Lower mold temperatures are preferred because of lower energy requirements and operational safety.

RIM elastomers are typically made by reacting an amine, a chain extender and a polyisocyanate together in a mold. Optional additives include catalysts, filler materials, mold release agents and the like.

The RIM elastomers of this invention are prepared using the polyoxyalkylenepolyamines such as the tetramine and hexamine products previously described or are prepared by using in combination a polyoxyalkylenepolyamine of this invention and a diamine or triamine terminated polyether (i.e., a polyoxyalkyleneamine having two or three terminal amine groups). Polyethers and polyoxyalkylenepolyamines useful in preparing the RIM elastomers have a molecular weight of 500 or more and, preferably, at least 2000. Especially preferred are the polyethers and polyoxyalkyleneamines of this invention, each having a molecular-weight of about 2000 to about 7000.

Useful polyoxyalkyleneamines are exemplified by those of the JEFFAMINE ® D- and ED-series which are diamine terminated polyethers and those of the JEFFAMINE ® T-series which are triamine terminated polyethers as previously described.

The chain extenders useful in the process of this invention are preferably difunctional. Mixtures of difunctional and trifunctional chain extenders are also useful in this invention. The chain extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. These chain extenders produce a polymer having a high glass transition temperature and/or high melting points when reacted with a suitable diisocyanate. It has been discovered that the polyurethane polymers of this invention which have a high glass transition temperature and a high melting point also show the improved properties in the process of this invention. Other chain extenders including cyclic diols such as 1,4-cyclohexane diol and ring containing diols such as bishydroxyethylhydroquinone, amide or ester containing diols or amino alcohols, aromatic diamines and aliphatic amines are also suitable as chain-extenders in the practice of this invention.

The polyisocyanate used to react with the polyoxyalkylene polyamine initiators may be aromatic or aliphatic polyisocyanate.

Typical aromatic polyisocyanates include p-phenylene diisocyanate, polymethylene polyphenylisocyanate, 2,6-toluene diisocyanate, dianisidine diisocyanate, bitolylene diisocyanate, napthalane-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These isocyanate compounds are produced by the phosgenation of corresponding methylene bridged polyphenyl polyamines, which are conventionally produced by the reaction of formaldehyde and primary aromatic amines, such as aniline in the presence of hydrochloric acid and/or other acidic catalysts. Known processes for preparing polyamines and corresponding methylene-bridged polyphenyl polyisocyanates therefrom are described in U.S. Pat. Nos. 2,683,730; 2,950,263; 3,012,008; 3,344,162 and 3,362,979.

Usually methylene-bridged polyphenyl polyisocyanate mixtures contain about 20 to about 100 wt% methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 wt% methylene diphenyldiisocyanate isomers, of which 20 to about 95 wt% thereof is the 4,4'-isomer with the remainder being polymethylene polyphenyl polyisocyanates of higher molecular weight and functionality that have an average functionality of from about 2.1 to about 3.5. These isocyanate mixtures are commercially available and can be prepared by the process described in U.S. Pat. No. 3,362,979 to Floyd E. Bentley.

The most preferred aromatic polyisocyanate is methylene bis(4-phenylisocyanate) or MDI. Pure MDI, quasi-prepolymers of MDI, modified pure MDI, are all useful in the preparation of RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure IDI is included also. This product is made by heating pure distilled MDI in the presence of a catalyst to give a mixture of pure MDI and modified MDI. Preferably, the amount of isocyanates used is the stoichiometric amount based on all the ingredients in the formulation or greater than the stoichiometric amount. Examples of commercial materials of this type are Upjohn's Isonate ® 125M (pure MDI) and Isonate ® 143L (liquid MDI).

Although not essential for the practice of this invention, additives which enhance the color or properties of the polyurethane elastomer may be used. For example, chopped or milled glass fibers, chopped or milled carbon fibers and/or other mineral fibers are useful.

The RIM polyurethane elastomers of this invention are made in the conventional manner in a mold at a temperature of about 120°-225° F. and are then post cured at a temperature of about 225°-400° F. and preferably about 225°-350° F.

Another type of additive, which may be required as post curing temperatures approach 400° F. or more, is an antioxidant. The materials which are well-known to those skilled in the art include hindered phenols.

The preparation of the valuable RIM elastomers is described in the following examples which are not to be construed as limiting in any way.

EXAMPLE 8

Preparation Of Polyurea Rim Using The Product Of Example 5

JEFFAMINE ® D-2000, a polyoxyalkylenediamine of about 2000 molecular weight (28.5 pbw), diethyltoluenediamine (DETDA) (39.0 pbw), ETHACURE ® 300, di(methylthio)toluenediamine from Ethyl Corp. (8.0 pbw), zinc stearate (1.75 pbw), a silicone surfactant L-5430 made by Union Carbide Chemical Corp. (0.5 pbw), and four functional polyamine 6292-15-2 of Example 5 (28.5 pbw) was charged into the B-component working tank of an Accuratio two component RIM machine. Quasi-prepolymer A, prepared by reacting THANOL ® SF-5505, a 5000-molecular weight high-reactive triol made by the Texaco Chemical Co. (40 pbw), and ISONATE ® 143L (60 pbw) made by The Upjohn Co., was charged into the A-component tank. The temperatures of the two streams were adjusted to 120° F. and 120° F., respectively. The components were injected into a flat plaque mold measuring 18-inch ×18-inch×0.125-inch which had been preheated to 130° F. The part, removed from the mold in 30 seconds, was a brittle elastomer. The mold temperature was then increased to 152° F. and the components were injected into the mold. After 30 seconds, the part removed from the mold exhibited no brittleness. This elastomer was post cured at 250° F. for 30 minutes. Physical properties of the elastomer are shown in Table IV. Similar flexural modulus, tensile, tear and shore D data is seen for the three elastomers. Improvement in properties is seen in higher impact values. A processing improvement is seen by the drop in the required mold temperature to process the material. A good RIM part must be molded above the point where the part is brittle, or it could break upon demold.

EXAMPLE 9

Preparation Of Polyurea Rim Using The Product Of Example 4

JEFFAMINE® D-2000 (28.5 pbw), diethyltoluenediamine (DETDA) (39.0 pbw), ETHACURE®300, from Ethyl Corp. (8.0 pbw), zinc stearate (1.75 pbw), a silicone surfactant L-5430 (0.5 pbw), and a four functional polyamine 6222-98 of Example 4 (28.5 pbw) were charged into the B-component working tank of an Accuratio RIM two-component machine. Quasi-prepolymer A, prepared as described in Example 8 above, was charged into the A-component tank. The temperatures of the two streams were adjusted to 120° F. and 120° F., respectively. The components were injected into the flat plaque mold which had been preheated to 153° F. The resulting elastomer was brittle. The mold temperature was increased to 162° F., 173° F., and 183° F. with the same result. Finally, at 195° F., the plaque formed was not brittle upon demold. The resulting elastomer was post cured at 250° F. for 30 minutes. Physical properties of the elastomer are shown in Table IV.

EXAMPLE 10 (COMPARATIVE)

Preparation Of Polyurea Rim Using JEFFAMINE® D-2000 And JEFFAMINE® T-5000 As The Amine Component JEFFAMINE® D-2000 (28.5 pbw), diethyltoluenediamine (DETDA) (39.0 pbw), ETHACURE® 300, from Ethyl Corp. (8.0 pbw), and JEFFAMINE® T-5000, a polyoxyalkylenetriamine of about 5000 molecular weight (28.5 pbw), were charged into the B-component working tank of an Accuratio RIM machine. Quasi-prepolymer A, prepared as described in Example 8 above, was charged into the A-component tank. The temperatures of the two streams were adjusted to 120° F. and 120° F., respectively. The components were injected into the flat plaque mold which had been preheated to 150° F., and after 30 seconds, the part was removed from the mold. The resulting elastomer was brittle upon demold. The temperature on the mold was increased to 200° F. in 10° increments while injecting into the mold. The plaques were brittle at these temperatures. At a mold temperature of 210° F., the plaque was no longer brittle. The resulting elastomer was post cured at 250° F. for thirty minutes. Physical properties of the elastomer are shown in Table IV. As can be seen from the table, improved izod impact values can be achieved relative to the comparative Example 10. Also, lower mold temperatures can also be achieved. It is common for thermal properties to decrease somewhat when lower mold temperatures are used.

TABLE IV
PHYSICAL PROPERTIES OF THE POLYUREA PRODUCTS OF EXAMPLES 8, 9 AND 10

| Example No. | 8 | 9 | 10 |
|---|---|---|---|
| Shore D, instant/10 seconds | 67/63 | 67/62 | 66/62 |
| Tensile, pli | 4661 | 4958 | 4894 |
| Tear, psi | 653 | 675 | 693 |
| Ultimate elongation, % | 197 | 220 | 217 |
| Flexural modulus, psi | | | |
| −20° F. | 195000 | 186000 | 182000 |
| 77° F. | 94000 | 91000 | 93000 |
| 158° F. | 65900 | 70500 | 67500 |
| 311° F. | 40000 | 44500 | 46000 |
| Heat sag | | | |
| 311° F., 150 mm | 19 | 14 | 9.5 |
| Izod Impact, ft-lbs/in of notch | 4.3 | 3.6 | 2.8 |
| Lowest mold temperature before brittleness occurred, °F. | 152 | 195 | 210 |

| Table of Test Methods | |
|---|---|
| Tensile, psi | ASTM D-638 |
| Tear, pli | ASTM D-624 |
| Ultimate elongation, % | ASTM D-638 |
| Flexural modulus, psi | ASTM D-790 |
| Izod impact, ft-lb/in. notch | ASTM D-256 |
| Heat sag, mm | Heat sag is determined in accordance with Test CTZZZ0066AA of the Chevrolet Division of General Motors Corporation, Flint, MI, and is the sample sag in millimeters when exposed to the specified temperature for 60 minutes. |

PREPARATION OF EPOXY RESINS

This invention also relates to an epoxy resin composition comprising a vicinal polyepoxide having an epoxide equivalency of greater than or equal to about 1.8, and a curing amount of a curing agent comprising a polyoxyalkylenepolyamine, for example, including, but not limited to the JEFFAMINE® D-series, T-series and EDR-series amines, and an amine selected from the group consisting of:

(1) A Type-A compound of the formula:

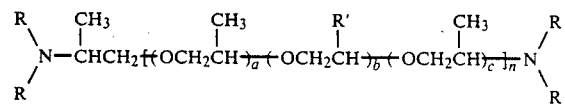

where a+b+c=2−100 and wherein R is:

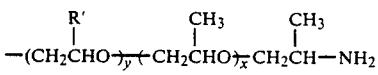

R' is selected from the group consisting of hydrogen and the methyl or ethyl radical, x ranges from 0 to about 10, y ranges from 2 to about 100, n is 0 or 1, and with the proviso that when n is 0, then R' is the methyl or ethyl radical; and (2) A Type-B compound of the formula:

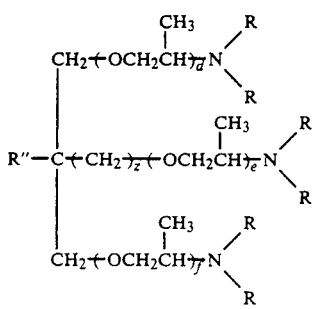

wherein R″ is selected from the group consisting of hydrogen and the methyl or ethyl radical, z is 0 or 1, R has the same meaning as previously described in (1) above and the sum of d+e+f ranges from 3 to 100.

Polyoxyalkylenepolyamines useful in preparing the epoxy resin compositions of this invention have molecular weights of about 148 or more and include, for example, diamines of the JEFFAMINE ® D-series, the JEFFAMINE ® EDR-series, or triamines from the T-series such as T-403. Suitable polyoxyalkylenediamines of the JEFFAMINE ® EDR-series include, for example: JEFFAMINE ® EDR-148 having the formula:

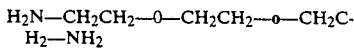

in (1) above and the sum of d +e +f ranges

The resulting cured epoxy resin compositions are clear materials especially suitable as castings or adhesives for use in electrical or electronic applications.

Tables V-VI show 24-53 wt.% of the Type A or B compound with the remainder being polyoxyalkylenediamine. Usually the curing agent will comprise from about 15 to about 60 weight percent of the Type A or Type B compound with the balance being the polyoxyalkylenediamine.

Generally, the amine-cured, vicinal polyepoxide-containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic.halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, .with either a polyhydric phenol or a polyhydric alcohol. An illustration, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylpropylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenylitolylmethylmethane, and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohol which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trieers and higher polymers; e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine-cured and are in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol. Further details concerning the nature and preparation of these epoxy novolak resins can be obtained in Lee, H. and Neville, K., *Handbook of Epoxy Resins*, McGraw-Hill Book Co., New York, 1976.

Other polyepoxides known to &:hose skilled in the art may be useful in this invention.

Optionally, the epoxy resin formulations of the instant invention can include an "accelerator" to speed the amine cure of the epoxy resin, especially at: ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7-14, describes the use of certain amine-containing compounds as epoxy curing agent-accelerators.

Many accelerators are known in the art which can be utilized in accordance with the instant invention. Examples include salts of phenols, salicyclic acids, amine salts of fatty acids, such as those disclosed in U.S. Pat. No. 2,681,901, and tertiary amines such as those disclosed in U.S. Pat. No. 2,839,480. Preferred accelerators in accordance with the instant invention are disclosed in U.S. Pat. Nos. 3,875,072 and 4,195,153.

It Will further be realized that various conveniently employed additives can be admixed with the polyepoxide-containing composition of the instant invention prior to final cure. For example, in certain instances it may be desired to add minor amounts of hardeners along with various other accelerators and curing agent systems well-known in the art. Additionally, conventional pigments, dyes, fillers, flame-retarding agents and the like which are compatible; natural or synthetic resins can be added.

The following examples illustrate the nature of the instant invention but are not intended to be limitative thereof.

EXAMPLE 11

This example illustrates the use of the polyoxyalkylenepolyamines of this invention in preparing clear epoxy castings and adhesives. Formulations, details of preparation and properties of the cured epoxy products are set out in Table V which follows. Runs A and B shown in Table V are examples of the clear, cured, epoxy resin compositions of this invention which exhibit highly satisfactory physical properties, while Runs C and D are comparative runs showing that opaque, cured, epoxy resin compositions result when the curing agent comprises prior art materials, such as JEFFAMINE ® T-5000.

TABLE V
PROPERTIES OF EPOXY RESIN PRODUCTS CURED WITH BLENDS OF THE 6292-73-2 PRODUCT OF EXAMPLE 6 AND JEFFAMINE ® D-230
(Elevated Temperature Cure)

| Formulation, Pbw | A | B | C | D |
|---|---|---|---|---|
| Liquid epoxy resin (epoxy equiv. wt 188) | 100 | 100 | 100 | 100 |
| JEFFAMINE ® D-230 | 31 | 30 | 31.2 | 30.5 |
| 6292-73-2 Prod. of Ex. 6 | 10 | 20 | — | — |
| JEFFAMINE ® T-5000 | — | — | 10 | 20 |
| Casting | clear | clear | opaque | opaque |
| Properties of Cured ⅛-inch Castings Cured 2 hours @ 80° C., 3 hours @ 125° C. | | | | |
| Shore D hardness, 0–10 sec. | 79–74 | 75–70 | 70–66 | 68–64 |
| HDT, °C., 264 psi/66 psi load | 66/73 | 54/65 | 70/77 | 63/72 |
| Izod impact strength, ft-lb/in | 0.16 | 0.25 | 0.22 | 0.36 |
| Tensile strength, psi | 7800 | 6100 | 8000 | 6500 |
| Tensile modulus, psi | 360000 | 290000 | 310000 | 250000 |
| Elongation, % | 8.1 | 12.1 | 8.7 | 8.1 |
| Flexural strength, psi | 13000 | 10800 | 14200 | 10300 |
| Flexural modulus, psi | 365000 | 287000 | 367000 | 283000 |
| Adhesion Properties Cured 1 hour @ 125° C. | | | | |
| Tensile shear strength, psi | 4100 | 3800 | 4600 | 3900 |
| T-peel strength, psi | 2.3 | 4.4 | 9.4 | 18.8 |

The liquid epoxy resin is Epon ® 828, a diglycidyl ether of Bisphenol A.

Results reported in Table VI which follows illustrate the use of the polyoxyalkylenepolyamines of this invention to make more compatible epoxy resin systems. Castings and adhesives prepared as set out in Runs E and F of Table VI, which utilize the polyoxyalkylenepolyamines of this invention, possess good physical properties. Runs G and H are comparative runs which show the use of prior art epoxy curing agents. Formulations, details of preparation and properties of the products are shown in Table VI.

TABLE VI
PROPERTIES OF EPOXY RESIN PRODUCTS CURED WITH BLENDS OF THE 6292-73-2 PRODUCT OF EXAMPLE 6 AND JEFFAMINE ® EDR-148
(Elevated Temperature Cure)

| Formulation, Pbw | E | F | G | H |
|---|---|---|---|---|
| Liquid epoxy resin (epoxy equiv. wt 188) | 100 | 100 | 100 | 100 |
| JEFFAMINE ® EDR-148 | 18.6 | 18.0 | 19.8 | 19.3 |
| 6292-73-2 Prod. of Ex. 6 | 10 | 20 | — | — |
| JEFFAMINE ® T-5000 | — | — | 10 | 20 |
| Casting | opaque | opaque | opaque | opaque |
| Properties of Cured ⅛-inch Castings Cured 2 hours @ 80° C., 3 hours @ 125° C. | | | | |
| Shore D hardness, 0–10 sec. | 76–71 | 76–68 | 70–65 | (1) |
| HDT, °C., 264 psi/66 psi load | 75/82 | 70/77 | 80/88 | |
| Izod impact strength, ft-lb/in | 0.30 | 0.27 | 0.20 | |
| Tensile strength, psi | 7400 | 6200 | 7800 | |
| Tensile modulus, psi | 350000 | 270000 | 250000 | |
| Elongation, % | 8.6 | 9.0 | 9.9 | |
| Flexural strength, psi | 12600 | 10200 | 11500 | |
| Flexural modulus, psi | 324000 | 400000 | 293000 | |
| Adhesion Properties Cured 1 hour @ 125° C. | | | | |
| Tensile shear strength, psi | 4200 | 3800 | 4300 | |
| T-peel strength, psi | 3.2 | 5.5 | — | |

(1) System not compatible; no properties determined. JEFFAMINE ® EDR-148 is triethylene glycol diamine.

What is claimed is:

1. A polyamine selected from the group consisting of:
(1) a Type A compound of the formula:

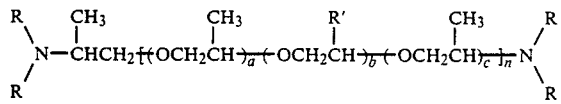

wherein $a+b+c = 2-100$ and R is:

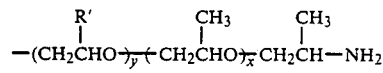

R' is selected from the group consisting of hydrogen and the methyl or ethyl radical,
x ranges from 0 to about 10,
y ranges from 2 to about 100, and
n is 0 or 1, and with the proviso that when n is 0, then R' is the methyl or ethyl radical; and
(2) a Type B compound of the formula:

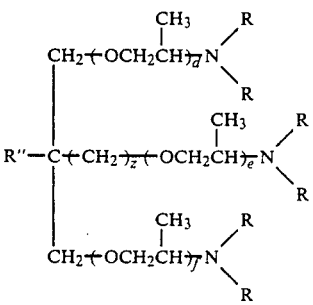

wherein
R" is selected from the group consisting of hydrogen and the methyl or ethyl radical,
z 0 or 1,
R has the same meaning as previously described in (1) above and the sum of $d+e+f$ ranges from 3 to about 100.

2. The polyamine of claim 1 wherein the said polyamine is a Type A compound.
3. The polyamine of claim 1 wherein the said polyamine is a Type A compound wherein n is 0 and R' is the methyl radical.
4. The polyamine of claim 1 wherein the said polyamine is a Type A compound wherein n is 1 and R' is the methyl radical.
5. The polyamine of claim 1 wherein the said polyamine is a Type B compound.
6. The polyamine of claim 1 wherein the said polyamine is a Type A compound, wherein n is 1 and R' is the ethyl radical.
7. The polyamine of claim 1 wherein the said polyamine is a Type A compound, wherein n is 1, R' is methyl and the sum of $x+y$ ranges from about 2 to 50.
8. The polyamine of claim 1 wherein the said polyamine is a Type A compound, wherein n is 1, R' is methyl and the sum of $a+b+c$ ranges from about 3 to about 33.

* * * * *